Dec. 15, 1936.            A. J. FISCHER            2,064,792
                      SEDIMENTATION APPARATUS
                       Filed Oct. 11, 1935            4 Sheets-Sheet 1
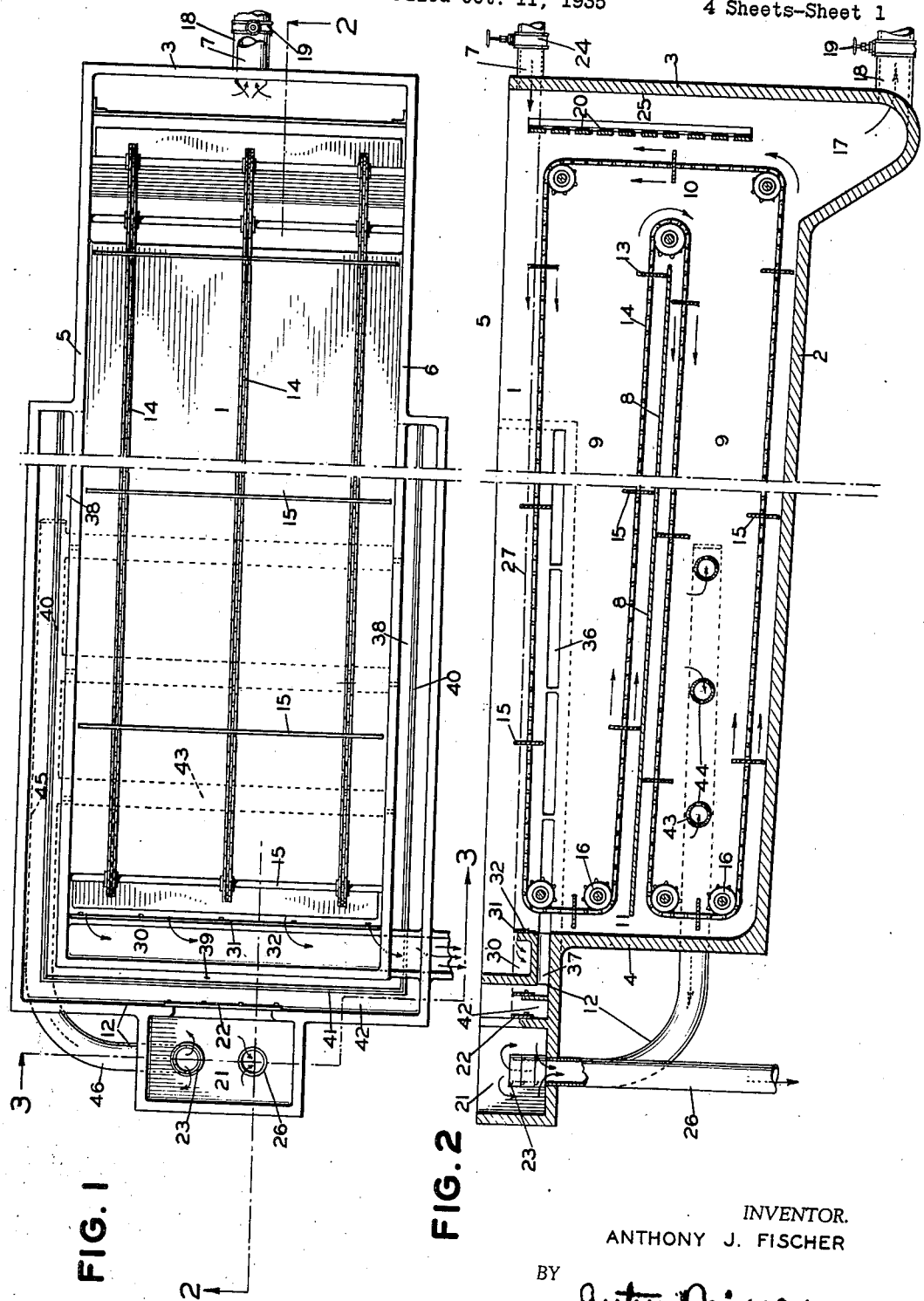
INVENTOR.
ANTHONY J. FISCHER
BY Arthur Middleton
ATTORNEY.

Dec. 15, 1936.  A. J. FISCHER  2,064,792
SEDIMENTATION APPARATUS
Filed Oct. 11, 1935  4 Sheets-Sheet 2
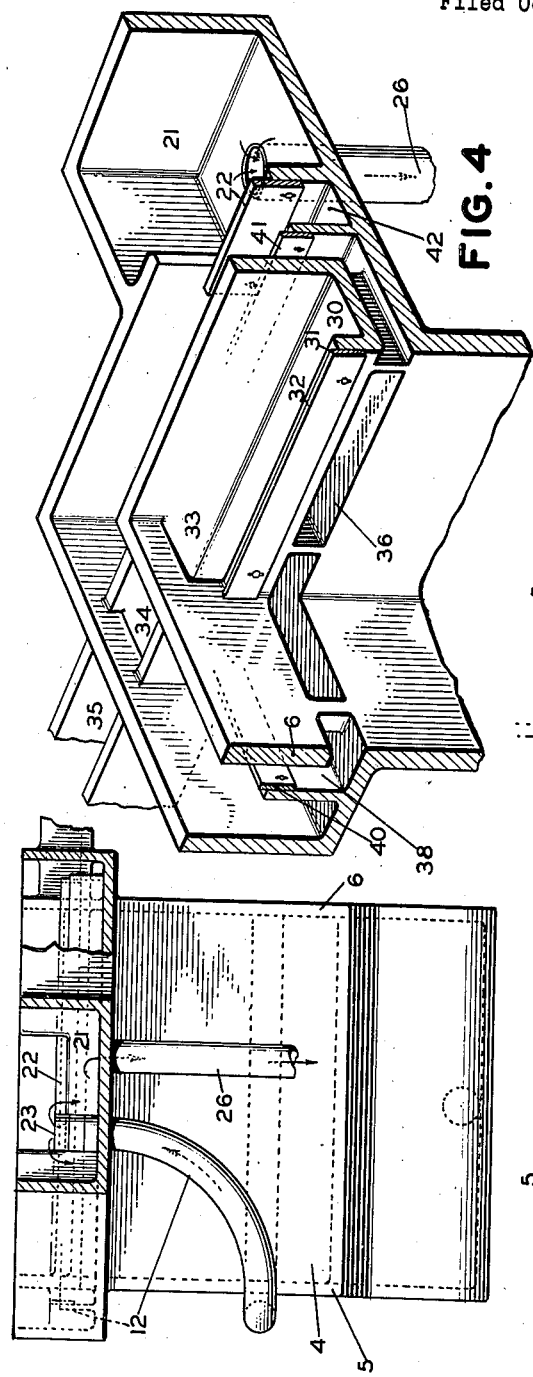
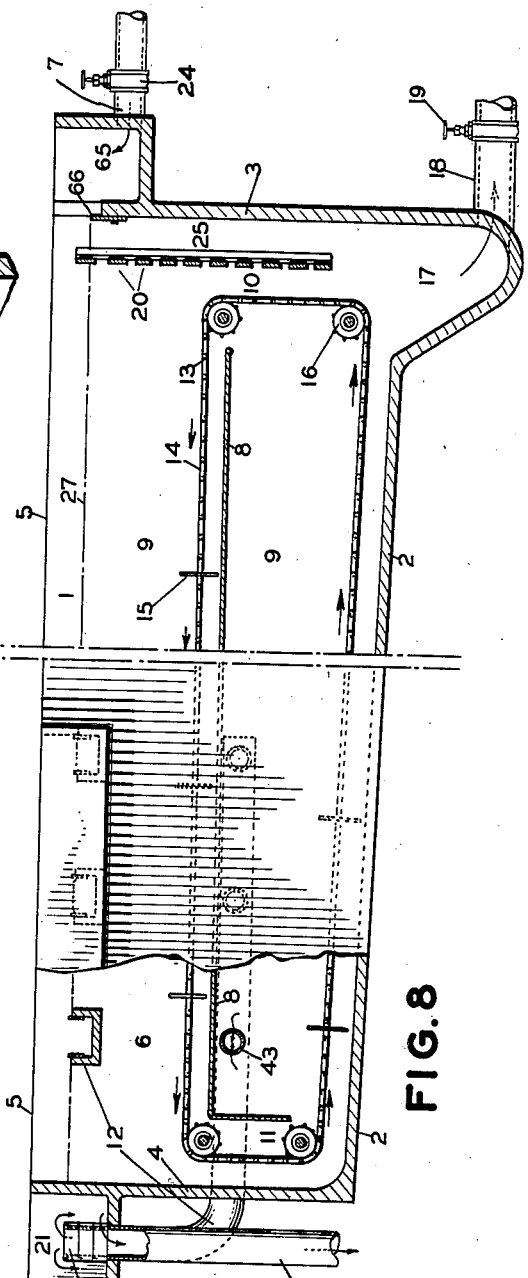
INVENTOR.
ANTHONY J. FISCHER
BY Arthur Middleton
ATTORNEY.

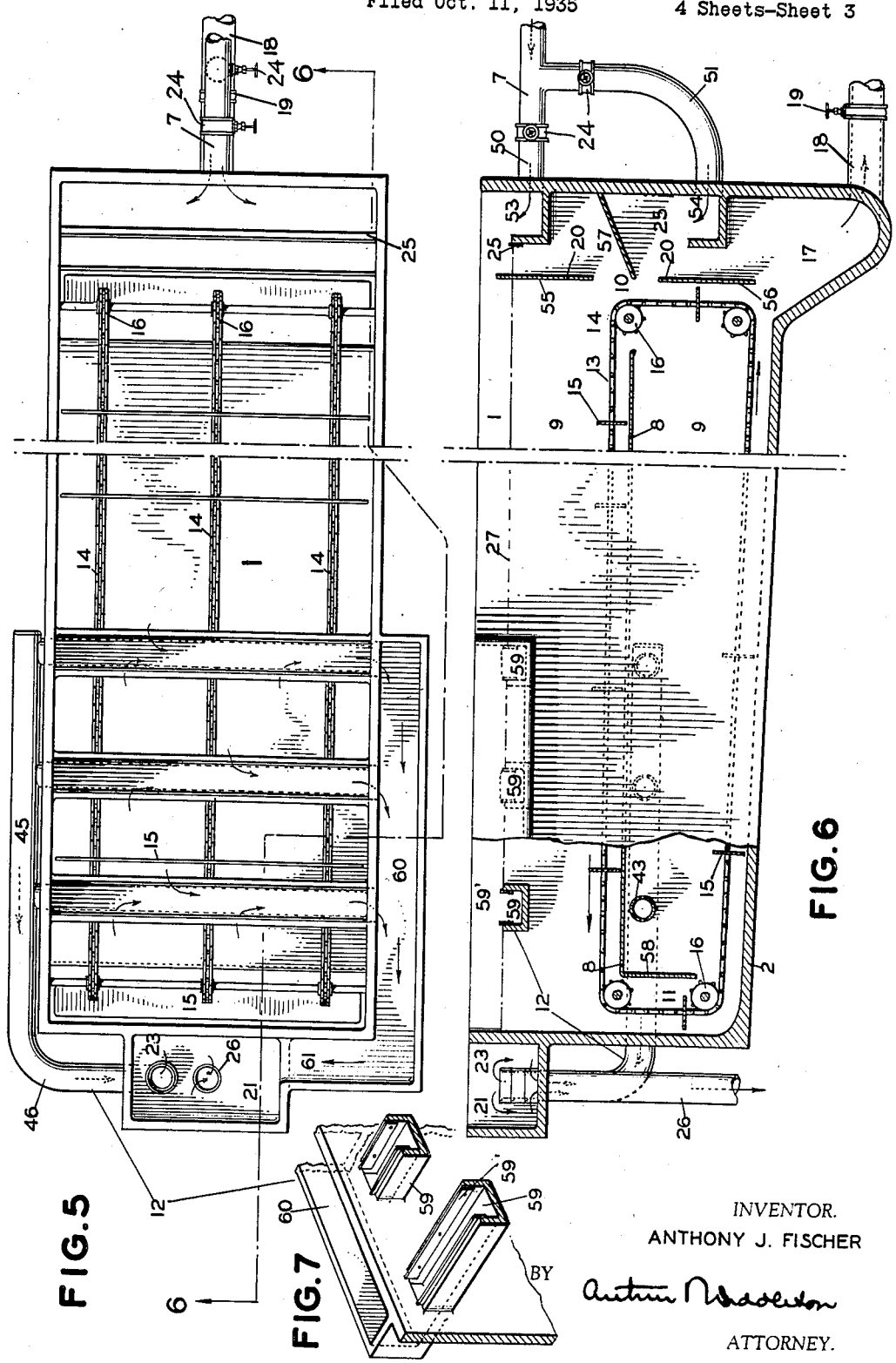

Dec. 15, 1936.  A. J. FISCHER  2,064,792
SEDIMENTATION APPARATUS
Filed Oct. 11, 1935  4 Sheets-Sheet 4
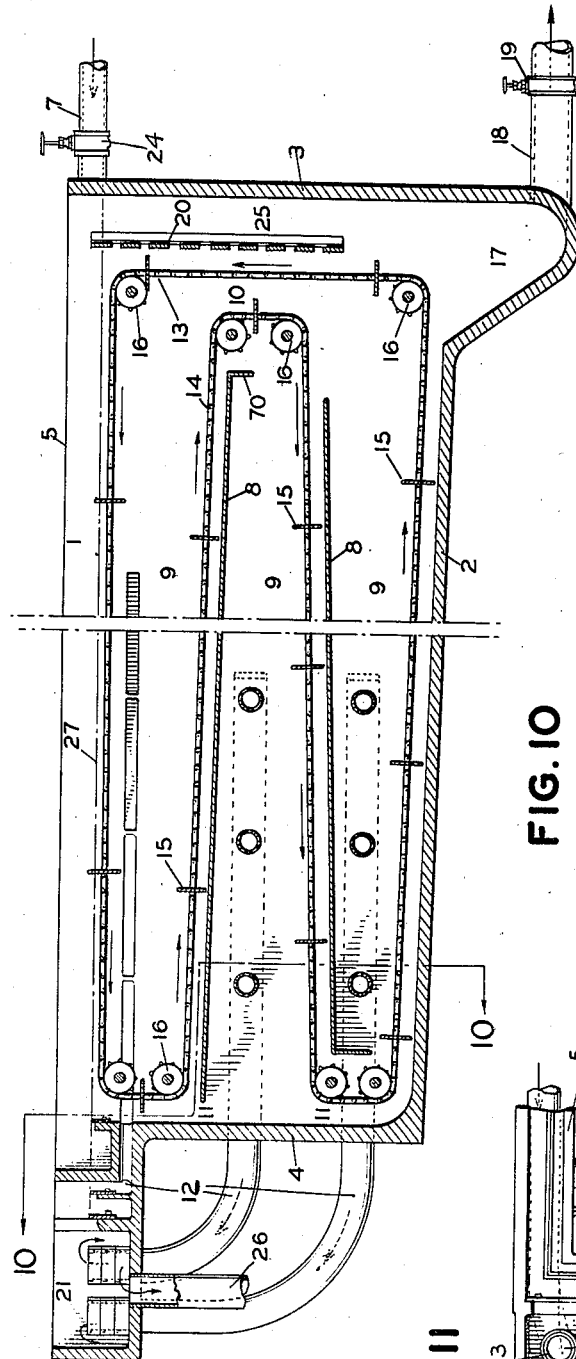
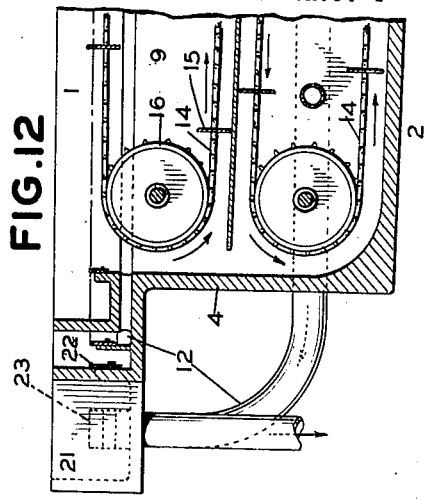
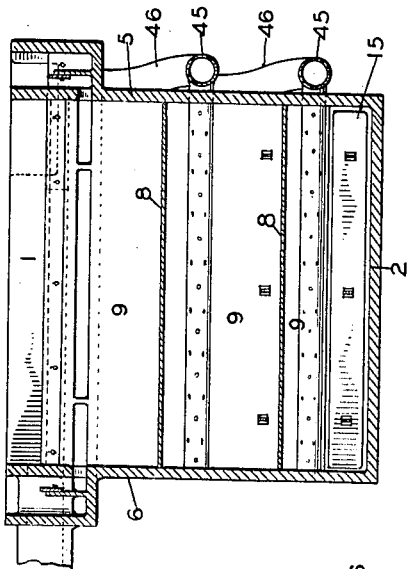
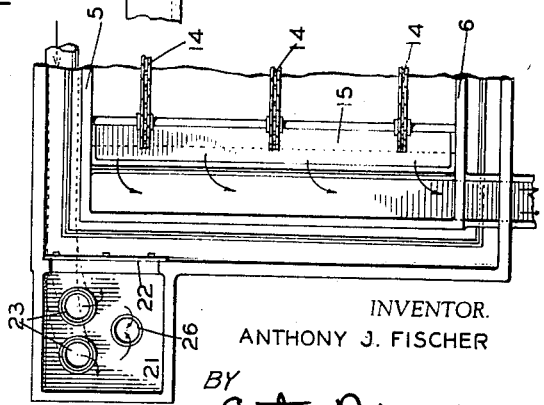
INVENTOR.
ANTHONY J. FISCHER
BY
ATTORNEY.

Patented Dec. 15, 1936

2,064,792

UNITED STATES PATENT OFFICE 2,064,792

SEDIMENTATION APPARATUS

Anthony J. Fischer, Jackson Heights, N. Y., assignor to The Dorr Company, Inc., New York, N. Y., a corporation of Delaware Application October 11, 1935, Serial No. 44,538

7 Claims. (Cl. 210—55)

The invention relates to that type of apparatus which is frequently referred to as a clarifier. The invention is particularly directed to apparatus according to which a rectangular tank or basin construction is employed that is divided by one or more relatively horizontally extending partial partitions whereby there is in effect provided what may be viewed or termed as superposed tray sections or as otherwise referred to as vertically arranged settling or sedimentation sections.

According to the present invention the incoming liquid-solids mixture, which is to be subjected to clarifying operation within the tank mentioned, is introduced at or in effect along what is termed the forward or feeding-in end or section of the tank and relatively clarified liquid overflows a weir and is withdrawn or passed from the tank by means of suitably arranged offtake conduits or effluent launder constructions into which the resulting relatively clarified liquid is received as it passes thereto from the upper interior portions of the tray or settling sections.

In the construction shown the clarified liquor passes into the outflow conduits or launders from places or localities which are distant or substantially spaced from the place into which the incoming mixture of liquid with solids in suspension therein initially enters the particular tray or settling section. Also according to the invention means is provided for the raking or scraping of settled solids—namely, solids which have settled from the liquid-solids mixture—from their place of settlement upon the partition or floor defining portion for each tray or settling section whereby the settled solids while still submerged can be scraped together and transferred whereby the then collected and transferred solids will be ultimately passed to and into a sump or solids receiving zone or section preparatory to the withdrawal of the collected settled solids from the tank or basin.

Solids settled from suspension and concentrated while still submerged are usually termed sludge, and more particularly if the settled solids have a substantial content of organic matter. If, however, the settled solids contain a preponderance of inorganic matter, instead of being referred to as sludge, they are often referred to as pulp especially in the practice of metallurgy. Nevertheless, the term sludge as employed herein is to be considered as a generic expression whose definition is broad enough to include any sediment regardless of whether organic matter or inorganic matter predominates in the sediment of settled submerged solids.

The term "clarifier" is frequently employed when applied to a sedimentation apparatus whose prime function is the obtaining of a clarified supernatant liquid, for example in connection with such apparatus when used in or for the clarifying of sewage where the paramount object thereof is the elimination of the suspended solids from the effluent and the attainment of sufficient clarity of effluent so that the effluent can be disposed of without danger of pollution resulting therefrom. However, when the same type of apparatus is used for example in the settling and concentrating or de-watering of metallurgical pulps, it is usually referred to as a "thickener", because when so used, the paramount object thereof is to concentrate or thicken or de-water the settled solids or sediment irrespective of the resulting condition of the supernatant effluent. Again, when the same type of apparatus is used to separate one type of suspended solid from another type, by separating one type and removing it in suspension in the supernatant effluent, while separating the other type and removing it in suspension in the underflow, the apparatus is called a "hydro-separator". Thus when using the same apparatus, if the desired end product is a clarified effluent when so used the apparatus is called a clarifier; if the desired end product is a thickened sediment or sludge when so used the apparatus is called a thickener; and if the desired end products are an effluent with one type of solid therein and an underflow with another type of solid therein when so used the apparatus is called a hydro-separator.

In each of the types of apparatus specifically referred to there is an elimination through the underflow of certain settleable solids or sediment and the withdrawal of the major portion of the liquid content as supernatant liquid from which the solids, or certain settleable solids, have been eliminated. The term clarifier as employed herein is therefore to be construed as used in the broad or generic sense and as including not only that type of apparatus which is often specifically referred to as clarifier but also other types of sedimentation apparatus some of which by way of illustration are referred to as thickeners and others as hydro-separators.

In the treating of sewage for the obtaining of a clarified effluent by sedimentation operation, there is frequently experienced a rising of scum particles to the top of the body of sedimenting sewage and an accumulation thereon of floating scum for the removal of which certain of the forms of apparatus described herein are provided with scum removing means. The scum removing means just referred to may be viewed as adjunctive or auxiliary to the rest of the defined structural features that are herein described as essential to its general use in the several fields of employment therefor.

The relatively horizontally extending partial partition (or partitions) referred to above has what may be termed as a sludge delivery end thereof and this may be and in fact is preferably provided with a depending apron. The raked and transferred sludge as delivered from the partition tend to gravitate readily and substantially upon a settling area or floor receiving section immediately below the place of said sludge delivery from the partition. The apron is provided for preventing any substantial deflecting or passing of the gravitating raked sludge into the relatively quiescent body of liquid-solids mixture that is undergoing a settling operation in the settling zone or section that is immediately under the partition having the depending apron.

According to a form of the invention that is particularly useful when the apparatus is to be employed in the treatment of sewage a scum receiving trough is provided into which any floating scum is automatically delivered from the uppermost portion of the liquid holding space or settling section within the tank or basin.

In order, however, to have a relatively large amount of offtake area for the clarified effluent there has been devised as a feature of the invention a construction according to which relatively clarified liquid from the upper interior section of the tank can pass outwardly through submerged openings that lead to a receiving and outflow launder construction which is in effect exteriorly located in respect to the tank proper. The launder construction just mentioned may be broadly viewed as an overflow conduit construction or even as a liquid withdrawal means and it is provided with an overflow weir arrangement which is relied upon for regulating—by hand regulation or control—the amount of liquid effluent passing or withdrawn from the uppermost section. It is to be noted also that vertically adjustable or vertically positionable overflow weir elements are provided for each of the clarified outflow conduit or effluent launder constructions whereby regulated control of clarified liquid delivery from each of the settling sections is enabled to be realized.

An object of the invention is to provide a relatively efficient and effective clarifying apparatus which will function on sewage or other liquids requiring clarification. A further object is to provide a form of apparatus that will require only a relatively small floor or ground area even though it must respond to large capacity requirements.

Several different aspects of the invention revolve about the features above referred to.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which:—

Fig. 1 is a plan view and Fig. 2 is a vertical sectional view of one form of clarifier embodying certain essential features of the invention, Fig. 2 being a longitudinally extending sectional view taken on the vertically extending plane indicated by the broken line 2—2 of Fig. 1 looking in the direction of the arrows;

Fig. 3 is a vertical view partially in section of the clarifier shown in Fig. 1 and Fig. 2, Fig. 3 being a transversely extending view taken as on the vertically and transversely extending planes indicated by the broken line 3—3 of Fig. 1 looking in the direction of the arrows;

Fig. 4 is a perspective view by which there are illustrated in considerable detail and in assembled relationship certain parts or portions of the apparatus shown in Fig. 1 and Fig. 2. It is to be noted that the parts are shown in Fig. 4 on a somewhat larger scale than in Fig. 1 and Fig. 2;

Fig. 5 is a plan view and Fig. 6 is a vertical view partially in section of another form of clarifier for realizing and employing certain essential features of the invention, Fig. 6 being in part a longitudinally extending sectional view and in part a side elevation and is a view taken as on the vertically and longitudinaly extending planes indicated by the broken lines 6—6 of Fig. 5 looking in the direction of the arrows;

Fig. 7 is a perspective view illustrating somewhat in detail the arrangement of certain parts of the apparatus as employed or embodied in the form of clarifier illustrated by Fig. 5 and Fig. 6, the parts are shown in Fig. 7 on a larger scale than in Fig. 5 and Fig. 6;

Fig. 8 is a vertically and longitudinally extending view of a form of apparatus similar in many respects to the form of apparatus shown in Fig. 5 and Fig. 6, and more particularly in respect to the liquid withdrawal conduits or means employed, Fig. 8 is in part a longitudinal sectional view and in part a side elevation;

Fig. 9 is a vertically and longitudinally extending sectional view of a form of clarifying apparatus similar in many respects to a form of apparatus shown in Fig. 1 and Fig. 2;

Fig. 10 is a vertically and transversely extending sectional view of the form of construction shown in Fig. 9, Fig. 10 being a view taken as on the vertically and transversely extending planes indicated by the broken line 10—10 of Fig. 9 looking in the direction of the arrows;

Fig. 11 is a partial plan view of a portion of the form of clarifier shown in Fig. 9;

Fig. 12 is a partial vertically and longitudinally extending view, partially in section, showing a manner of modifying certain parts of the construction as illustrated in Fig. 1 and Fig. 2.

Reference will now be made to the drawings in detail.

General as to all forms

Each of the forms of clarifiers as illustrated by the several figures has in common certain essential features or characteristics which will now be pointed out.

Each form of clarifier has:—

(a) A tank or basin construction collectively designated by 1 having a bottom or floor portion 2 from which there upwardly extends longitudinally-spaced transversely-extending front end wall 3 and rear end wall 4 and transversely-spaced longitudinally-extending side walls 5 and 6;

(b) Influent supply means 7—sometimes referred to as feeding-in means—by which the liquid-solids mixture to be subjected to a clarifying operation is introduced or delivered into the forward or receiving end section of the tank or basin;

(c) A substantially horizontally-extending partial partition 8 (or partial partitions) that extends from side wall to side wall but only part way lengthwise of the tank interior whereby the interior of the tank is divided into vertically arranged settling compartments or zones 9, 9 which are in communication through the medium of openings or communicating spaces 10 and 11 respectively located at the forward and rearward interior end sections of the tank;

(d) A plurality of outflow conduit or effluent launder constructions collectively designated as 12 which are provided for withdrawing relatively clarified supernatant liquid from the upper rear portion of the superposed settling compartments or zones 9, 9 above referred to.

(e) A sludge raking and conveying mechanism collectively designated by 13 having endless carriers 14 upon which there are mounted and by which there are actuated scraping and conveying blades or flights 15, which said endless carriers are supported and guided by wheels or sheave members as 16 certain of which wheels or sheave members are driven in any suitable manner for effecting the desired movement of the scraping blades 15 over and along the floor portions or solids-settling area as provided by the partition (or partitions) 7 and the bottom 2 and in this connection it is to be noted that this movement of the scrapers or blades 15 is relied upon for effecting incident to a moving of the scraping blades along a closed path, a scraping of the settled solids and a transfer of the thus scraped solids or sludge in a manner whereby said scraped and transferred sludge will ultimately pass to and into a sump or a solids-receiving section as 17 with which the tank construction is provided;

(f) A sludge-discharge conduit providing means as 18 and which is controlled as to operation by valve 19 is provided for effecting a hydraulic transfer from the sump or solids-receiving section of settled solids which have passed into the latter;

(g) A vertically and transversely extending apertured partition or directing plate construction 20 is located in the space providing the forward communicating opening 10 that is left existent between the forward end of the horizontal partial partition (or partitions) 8 on the one hand and the front end wall 3 on the other hand; and (h) A collecting and discharge box 21, sometimes referred to as overflow receiving box, into which the several outflow conduit or launder constructions 12 deliver the clarified effluent as passed therethrough from the settling zones or compartments 9, a pipe or conduit 26 leading from this box is provided for conducting away the liquid overflowing into and collected by the box.

There is an overflow conduit or effluent launder construction for each of the settling compartments 9 and it is noted that each of said outflow constructions is provided with a vertically adjustable or vertically positionable weir element as 22 or 23 for controlling the amount of clarified effluent passing the weir of each particular outflow construction relative to the amount of clarified effluent passing the weir (or weirs) of the other outflow (or outflows). It is also to be noted that each liquid supply means or feeding-in means has valve means as 24 and is arranged so as to deliver the incoming mixture into an initial receiving space as 25 which is provided between vertically and horizontally extending apertured or spaced partition plates 20 on the one hand and the front end wall 3 of the tank on the other hand. The broken line 27 indicates the normal operative level of the liquid or liquid-solids mixture within the tank or basin.

Bearing in mind that the foregoing description is applicable to each of the several figures illustrated, it is now in order to take up for further detailed consideration each form as illustrated.

Form of Fig. 1 to Fig. 4

It is to be noted that according to the arrangement of these figures the incoming solids-liquid mixture initially enters the receiving space 25 under conditions favorable to a direct dropping or gravitation of the heavier or larger solid particles into the sump or solids receiving space 17 and that due to apertures or distributive openings that exist in the transverse partition 20 there is effected a relatively uniform and gradual and easy distribution of the incoming solids-liquid mixture into the upper and lower settling zones 9 or sedimentation compartments as said sections 9 may be referred to. The operative movement of the sludge-raking and conveying mechanism 13 is extremely slow and thus functions in a manner not to upset the uniform delivery and distribution incident to the normal functioning of the apertured plate or partition 20 as a distributing element, or not to upset or interfere with sedimentation.

The form of apparatus shown in these figures has been constructed so as to embody a scum trough 30 having an intake edge portion 31 which is provided with a vertically adjustable or vertically positionable weir plate 32. The scraping and conveying mechanism 13 is constructed so that when the scraping blades 15 are moving along an uppermost section of their path of travel they operate to cause a skimming of any floating scum particles and a forcible propelling of the thus skimmed particles in the direction of the arrows, namely, toward and into the scum trough 30 just referred to. A reference to Fig. 4 will make it clear that this scum trough 30 is constructed in reference to the side wall 6 of the basin in such a manner that the scum can pass outwardly through openings 33 and 34 to a scum trough section 35 which is exteriorly located in respect to the tank or basin proper. With the exception of the wall 31 the structure defining the scum trough extends substantially above the normal liquid level which is indicated by the line 27.

The scraper flights or blades 15 move not only along and in the immediate vicinity above the floors or areas receiving settled solids as defined by the partition 8 on the one hand and the bottom of the tank 2 on the other, but also during some portion of their travel move along and adjacent the underside of the partition 8 in a manner to remove scum tending to collect on and in a manner to prevent the accumulation of any substantial quantity of scum from collecting on the underside of said partition 8. It will also be noted that any scum scraped from or conveyed along the underside of the partition 8 is ultimately passed to a position from which it can rise through the space 11 and to a position from which the scum will pass ultimately to and into the scum receiving trough 30.

The outflow or effluent launder constructions 12 heretofore referred to in fact comprise two relatively independent outflow arrangements for conducting relatively clarified effluent from the interior of the tank. One of these arrangements, to wit, the upper one is provided by apertured portions 36 and 37 leading from the upper portion of the delivery or rear end section of the upper settling zone 9 toward and into trough shaped receiving spaces 38 and 39 from which the clarified effluent passes over vertically-positionable weir or overflow plates 40 and 41 into an auxiliary or collecting section 42 the outflow from which is over and past the vertically positionable or vertically adjustable weir plate 22 to and into the collecting and discharge box 21. Another relatively complete outflow arrangement or construction is employed for the lower compartment 9. This last mentioned construction provides longitudinally-spaced transversely-extending conduits or pipes 43 having apertures as 44 therein that permit the inflow of relatively clarified supernatant liquid from the discharge or rear section of the lower settling zone 9. The supernatant liquid which passes into the apertured conduits or pipes 43 is delivered into a longitudinally extending conduit section 45 that continues into a curved section 46 which terminates in an adjustable weir section provided by and because of removable and replaceable ring members that constitute the weir elements 23 previously referred to. From what has previously been stated herein it will be manifest that the vertically positionable weir plate 22 and the vertically positionable or replaceable weir rings 23 can be adjustably positioned to regulate the relative flow of supernatant effluent from the upper and lower settling compartments 9.

The form of clarifier illustrated in and by Fig. 1 to Fig. 4 is referred to herein as the first form.

*Form of Fig. 5 to Fig. 7*

The clarifier arrangement shown in Fig. 5 to Fig. 7 is referred to herein as the second form. This second form functions in much the same manner as the first form but the following points can well be referred to at this time. As to the influent supply means 7 this includes two valve control branches 50 and 51. The upper branch 50 leads to and delivers into a transversely extending upper trough section 53 while the lower branch 51 leads to and delivers into a transversely extending lower trough 54. The transversely extending partition construction 20 is in effect defined by the vertically spaced plate sections 55 and 56 and a rearwardly and downwardly sloping transversely-extending plate or partition 57 which serves to divide the initial receiving section 25 into upper and lower sections into which the incoming liquid-solids mixture is delivered as it flows from the upper and lower troughs 53 and 54 just referred to. It will be noted, however, that the effect of the arrangement just described is a relatively uniform delivery and distribution of incoming liquid-solids mixture into the upper and lower settling zones or compartments 9 but under conditions that will permit a direct settling or gravitation out of suspension of the relatively heavier or larger solid particles to and into the sump or solids receiving section 17 which is located immediately below the initial receiving section 25 just referred to.

The relatively horizontal partition 8 is provided at the rear end thereof with a depending transversely extending apron 58 which is provided for preventing an intermixing of gravitating solids which have been raked and transferred along and from the top of partition 8 as the result of the operating of the solids raking and collecting mechanism 13. In other words, the apron 58 prevents, to a substantial extent, gravitating solids from entering the supernatant liquid existing in the upper part of the delivery or rear section of the lower settling zone 9.

As to the outflow construction of this second form it will be noted that there is provided within the upper interior portion of the tank three effluent launders or troughs 59 having vertically adjustable weir plates 59' into which supernatant liquid flows from the uppermost portion of the delivery section of the upper settling zone 9. These launders or troughs 59 lead into a common longitudinally extending trough 60 which in turn delivers into a transversely extending trough 61 leading to the collecting and discharge box 21. The outflow construction for the lower settling zone comprises the apertured troughs or launders 43, the longitudinally extending collecting section 45 and the curved section 46 that terminates in a vertically positionable or vertically adjustable overflow section which is provided by the removable and replaceable ring shaped weirs 23. In short the construction and functioning of this lower outflow construction is identical with that described in connection with the first form of apparatus as illustrated in Fig. 1 to Fig. 4.

*Form of Fig. 8*

The form illustrated in Fig. 8 and which is referred to as the third form is substantially the same as that described in connection with the second form with the exception that the supply means 7 has a trough portion 65 that in effect is exteriorly located with respect to the tank proper, that extends transversely of the tank and from which the incoming liquid-solids mixture overflows past a vertically adjustable weir plate 66 directly into the initial receiving space 25 which is provided immediately ahead of the apertured plate construction 20 and which apertured plate construction is the same as the apertured plate construction of Fig. 1 and Fig. 2 but which is somewhat different from the corresponding distributing partition construction employed in the second form.

*Form of Fig. 9, Fig. 10 and Fig. 11*

The clarifier arrangement shown in these figures is referred to as the fourth form. In effect it functions substantially the same as the first form as described in connection with Fig. 1 to Fig. 4. This fourth form, however, has been incorporated to show an arrangement in which two partition plates 8 are employed thus dividing the sedimentation section of the tank into three vertically arranged settling compartments which are in direct communication with each other. Each partition 8 has a depending transversely-extending apron 70 located at the end of the partition from which the raked and transferred solids are delivered as the result of the functioning of the solids or sludge raking and collecting mechanism 13. In other words this fourth arrangement employs the advantageous features (a) incident to the scum collector of the first form, (b) incident to the outflow arrangements or constructions of said Fig. 1 and the outflow controls incident to the weir arrangements thereof, (c) to the inflow distribution of said first form, and (d) to the depending apron arrangement of the second form.

*Form of Fig. 12*

This is referred to as the fifth form. This fifth form is exactly the same as the arrangement of the first form, to wit, that of Fig. 2 with the exception that in each of certain places a single set of large guide or sprocket wheels is provided in place of two sets of small guide or sprocket wheels, this change is readily apparent from a comparison of Fig. 12 with Fig. 2.

I claim:—

1. A sedimentation apparatus comprising in combination a rectangular tank having a bottom constructed so as to provide a solids receiving section at the feed receiving end of the tank, upstanding walls, and a relatively horizontal partition extending from side wall to side wall but at least at one end terminating short of the tank end whereby the interior of said tank is divided into settling sections arranged one above another and in direct communication with each other; means for supplying liquid-solids mixture to be clarified to the upper interior portion of the feed receiving section of the tank; means for withdrawing settled solids from said solids receiving section; an apertured partition that extends substantially from side wall to side wall of the tank and from the upper interior portion of the tank and substantially downwardly within the tank; an endless solids raking conveyor having an upper and a lower sludge engaging operating strand, which strands extend respectively above and below said horizontal partition, both said strands effective to scrape and convey settled sludge along the respective settling area of a respective settling section ultimately to and into said solids receiving section; individual effluent conduit means arranged to receive individually supernatant liquid from each of said settling sections respectively, each of which effluent conduit means has an overflow section which is regulatable for adjustably controlling the amount of liquid withdrawal from one settling section relative to the amount of liquid withdrawal from the other.

2. A construction as defined in and by claim 1 and according to which the tank is provided with a scum collecting launder arranged so as to receive scum passing thereinto from the interior portion of the uppermost settling section, which scum collecting means has a scum overflow weir over and past which scum is directed into said scum collecting launder by and as the result of the movement of some of the scrapers which during some portion of their path of travel move along the upper interior portion of the tank toward and in the direction of said scum overflow weir.

3. A construction as defined in and by claim 1 according to which the aforementioned mechanical element of the endless solids raking and conveying means comprises a pair of endless members which during some portion of their travel move along paths immediately above but adjacent to one of the partitions and which during another portion of their travel move along paths immediately below but adjacent to the partition whereby as said solids raking and conveying means functions the settled solids are raked and conveyed along the floor provided by said partition and whereby scum collected at the underside of the partition is scraped therefrom.

4. A construction as defined in and by claim 1 and according to which the tank is provided with a scum collecting launder arranged so as to receive scum passing thereinto over a weir section thereof from the interior portion of the uppermost settling section, according to which the solids raking and conveying means provide certain members which during some portion of their movement effect a transferring of floating scum toward said weir section of the scum collecting launder, and also according to which each of the outflow means has liquid intake openings entirely positioned at a lower elevation than that defined by the overflow portion of said weir section of the scum collecting launder.

5. A clarification apparatus comprising in combination a rectangular tank having a bottom constructed so as to provide a solids receiving section and upstanding end and side boundary walls; means for supplying liquid-solids mixture to be clarified to a feed receiving section within the tank; means for withdrawing settled solids from said solids receiving section; and solids raking and conveying means for effecting a scraping and transferring of settled solids whereby there is an ultimate passage of the scraped settled solids to said solids receiving section; said tank having a construction providing a transverse scum receiving launder that extends at the upper interior portion along one end wall of the tank and past an upstanding boundary side wall of the tank to the exterior of the latter and also providing an outflow launder construction having a centrally located launder portion extending along said end wall and lateral launder portions extending along the adjoining portions of the side walls into which supernatant liquid passes from the upper interior portion of the tank through openings in the upstanding boundary walls of the tank, the entrance ends of certain of which openings are entirely below the scum receiving launder and lead to said outflow launder which is in effect exteriorly located in respect to the boundary walls.

6. A construction as defined in and by claim 5 according to which a section of the scum launder overlies a section of the exteriorly located outflow launder whereby liquid in the outflow launder can flow therealong below and past the overlying scum launder.

7. A clarifier having a tank divided by a relatively horizontally extending partial partition into upper and lower communicating settling compartments and a solids raking and conveying means comprising a pair of endless members which during some portion of their travel move along a path immediately above but adjacent to the partitions and which during another portion of their travel move along a path immediately below but adjacent to the partition whereby as said solids raking and conveying means functions, the settled solids are raked and conveyed along the floor provided by said partition and scum collected at the underside of the partition is scraped therefrom.

ANTHONY J. FISCHER.